United States Patent
Tang et al.

(10) Patent No.: US 12,298,558 B2
(45) Date of Patent: May 13, 2025

(54) OPTICAL ISOLATOR INTEGRATED WITH OPTICAL DEVICES

(71) Applicant: Taiwan Semiconductor Manufacturing Co., Ltd., Hsinchu (TW)

(72) Inventors: Cheng-Tse Tang, Hsinchu (TW); Chewn-Pu Jou, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 264 days.

(21) Appl. No.: 17/866,335

(22) Filed: Jul. 15, 2022

(65) Prior Publication Data

US 2023/0273370 A1    Aug. 31, 2023

Related U.S. Application Data

(60) Provisional application No. 63/314,254, filed on Feb. 25, 2022.

(51) Int. Cl.
*G02B 6/124* (2006.01)
*G02B 6/12* (2006.01)
*G02B 6/136* (2006.01)
*G02B 6/34* (2006.01)

(52) U.S. Cl.
CPC .......... *G02B 6/124* (2013.01); *G02B 6/12011* (2013.01); *G02B 6/136* (2013.01); *G02B 6/34* (2013.01); *G02B 2006/12107* (2013.01)

(58) Field of Classification Search
CPC ................. G02F 1/035; G02B 6/14
See application file for complete search history.

(56) References Cited

U.S. PATENT DOCUMENTS

| 9,664,857 | B2 | 5/2017 | Carroll et al. |
| 10,466,515 | B2 | 11/2019 | Heck et al. |
| 2005/0069240 | A1* | 3/2005 | Griffin ................ G02B 6/125 |
| | | | 385/39 |

FOREIGN PATENT DOCUMENTS

| CN | 110114942 A | 8/2019 |
| TW | 202204950 A | 2/2022 |

* cited by examiner

*Primary Examiner* — Michael P Mooney
(74) *Attorney, Agent, or Firm* — Seed IP Law Group LLP

(57) ABSTRACT

A device includes an optical isolator disposed between adjacent optical waveguides along a direction. The optical isolator has vertical or horizontal dimensions that are different than at least one of the optical waveguides. The vertical and horizontal dimensions are greater than vertical and horizontal dimensions of at least one of the waveguides. In various embodiments, the structure of the optical isolator can be a planar structure, a columnar periodic structure, or a grating structure. The material of the optical isolator can be a metallic material or a dielectric material. In some embodiments, the optical isolator and the optical waveguides are used to enhance the performance of an optical multiplexing device.

20 Claims, 11 Drawing Sheets

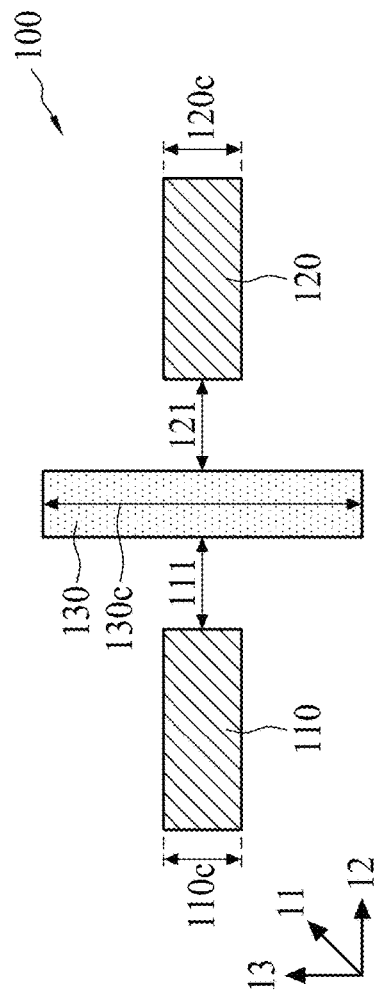
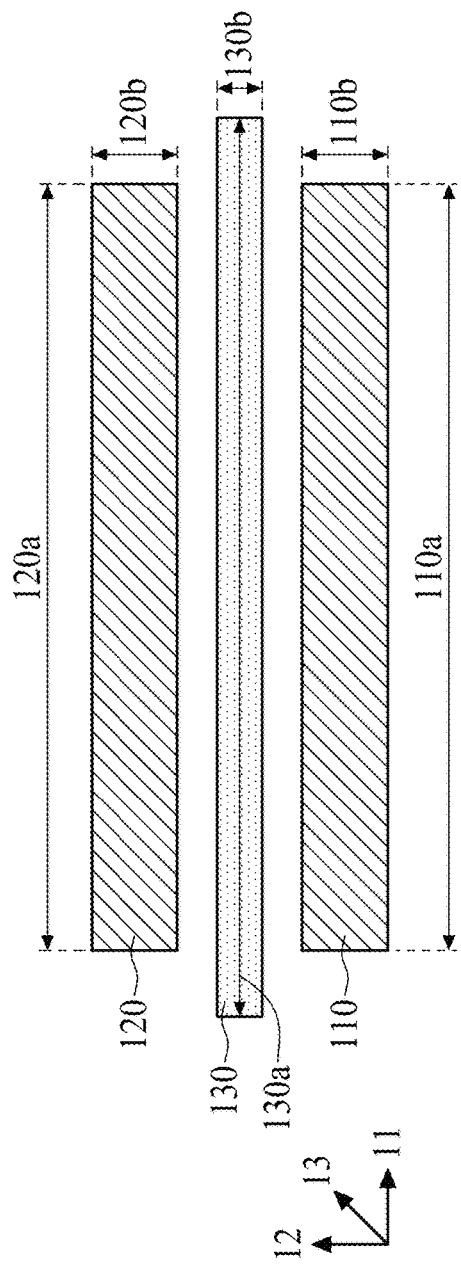
FIG. 1A
FIG. 1B

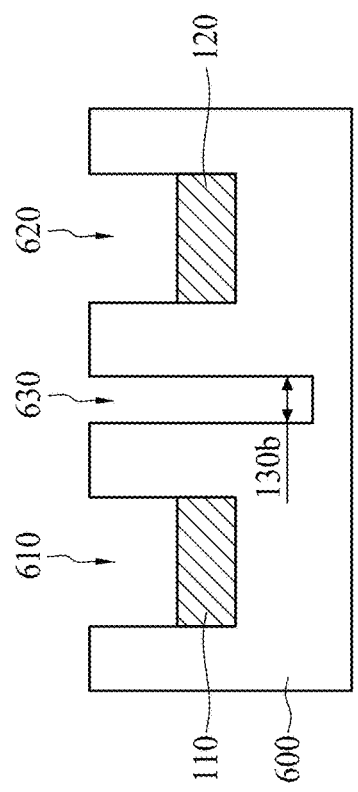
FIG. 6C
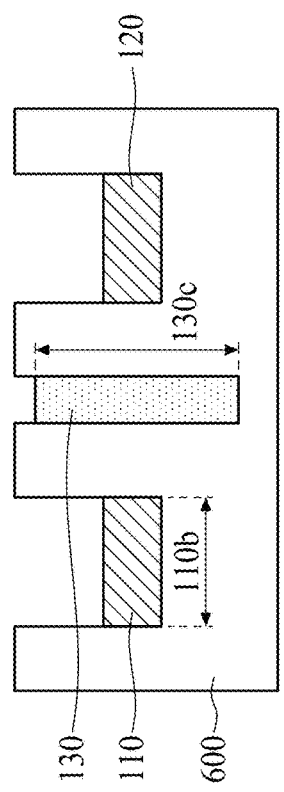
FIG. 6D
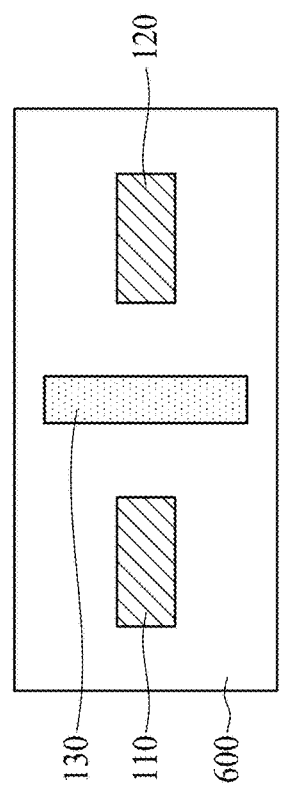
FIG. 6E
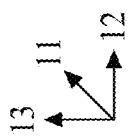

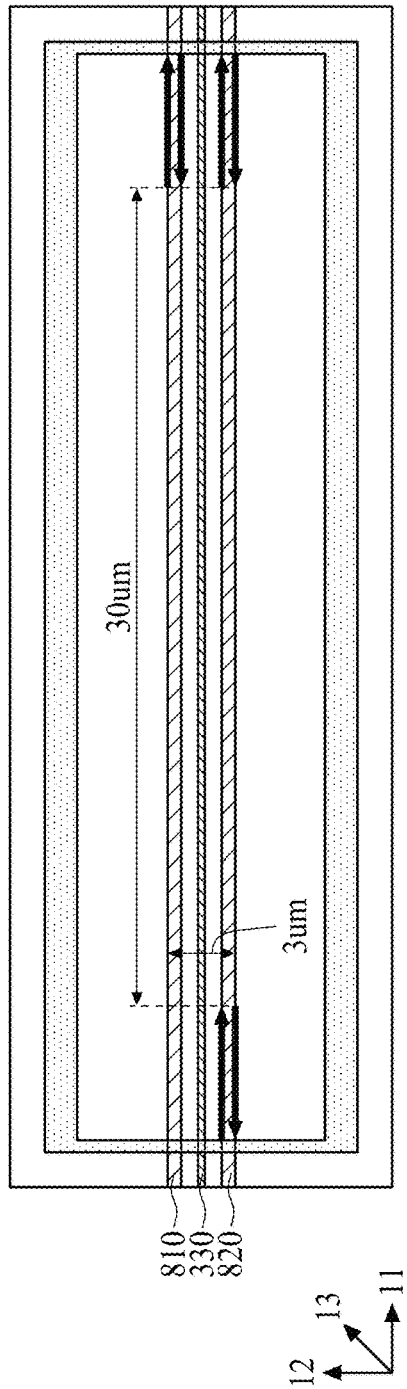
FIG. 10A
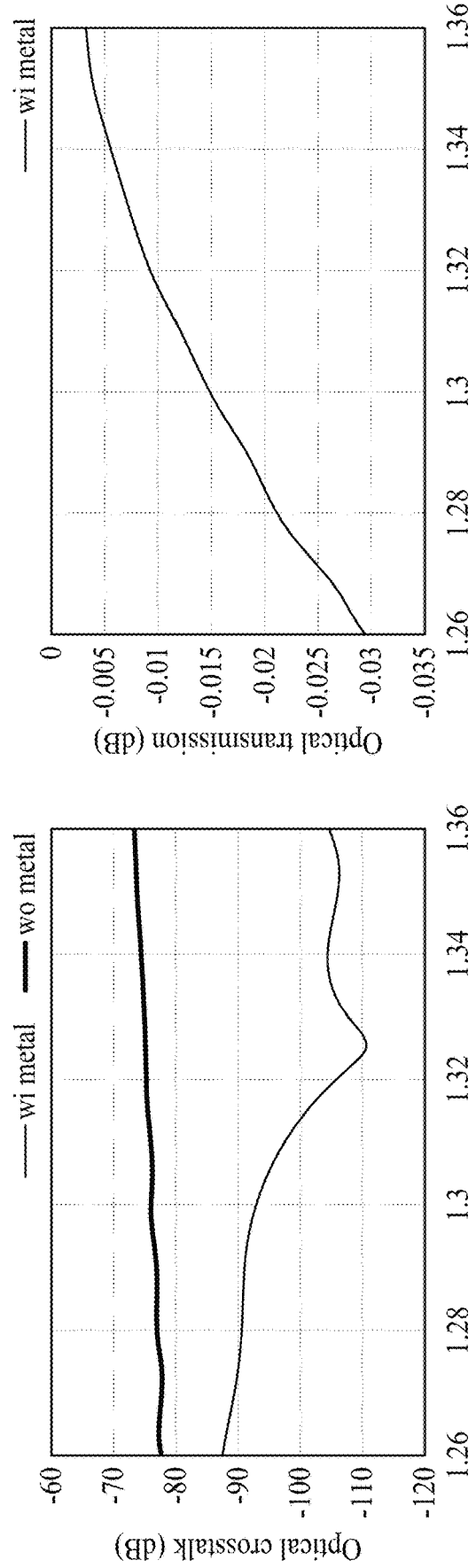
FIG. 10C
FIG. 10B

OPTICAL ISOLATOR INTEGRATED WITH OPTICAL DEVICES

BACKGROUND

Description of the Related Art

Optical isolators are structures that beneficially reduce or prevent optical interferences between multiple waveguides. Such optical interferences may include optical crosstalk between the optical waves passing through the optical waveguides.

Optical circuits generally include multiple optical devices coupled together with optical waveguides. In addition, operation of some optical devices such as interferometers or optical multiplexers depends on design and structure of the optical waveguides. In such structures, multiple waveguides may be integrated in a small area of micro/nano dimensional optical chips. Optical isolators are optical structures that are used to protect the waveguides from unwanted interferences, in particular, where multiple waveguides are integrated in the small area. As such, optical isolators may optically isolate an optical element from another optical element. Efficiency of the optical isolators depends on the material and design of the structure. Higher efficiency benefits the capability of miniaturizing the size of the optical chip by reducing distances between the optical waveguides.

BRIEF DESCRIPTION OF THE SEVERAL VIEWS OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be increased or reduced for clarity of discussion.

FIG. 1A is a cross-sectional view schematically illustrating a device having waveguides and an optical isolator therebetween, in accordance with some embodiments.

FIG. 1B is a top plan view schematically illustrating relative positioning of the waveguides and the optical isolator of the device shown in FIG. 1A, in accordance with some embodiments.

FIGS. 6A-6E are schematic illustrations of waveguides and the optical isolator therebetween of FIGS. 1A-1B, in accordance with some embodiments at various stages of manufacture.

FIG. 10A schematically illustrates a device having waveguides and an optical isolator therebetween that is utilized to generate test results shown in FIGS. 10B and 10C, in accordance with some embodiments.

FIGS. 10B and 10C are plots of simulation results associated with optical crosstalk between the waveguides and optical transmission of the waveguides in a normalized range of the wavelength, in accordance with some embodiments.

DETAILED DESCRIPTION

Figure 2A:
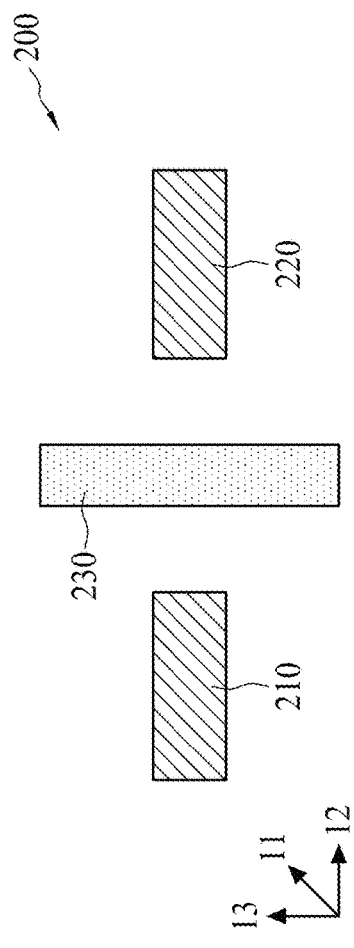
FIG. 2A is a cross-sectional view schematically illustrating a device having waveguides and a discrete periodic structure as an optical isolator therebetween, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Optical isolators are optical structures which are designed to reduce or prevent optical interferences between optical devices and waveguides in a device, such as inside an optical chip. Optical crosstalk is a type of optical interference between the waveguides, for example, where a signal transmitted in a first waveguide causes an undesired effect in a second waveguide due to some optical coupling between the first and second waveguides. Reducing the optical crosstalk enhances the performance of an optical circuit. Extinction ratio (on-off state) is a parameter of the optical circuit that inversely relates to the optical crosstalk. Increasing the extinction ratio enhances a resolution of communication between optical devices of the optical circuit.

Increasing distances between the waveguides can reduce the optical crosstalk. The crosstalk typically increases as the size of the optical chip is reduced or minimized. For example, reducing the size of an optical chip may result in or otherwise be facilitated by reducing a distance between waveguides in the optical chip, which can have the undesirable effect of increasing optical crosstalk between the waveguides. Using optical isolators in the optical chip thus facilitates miniaturization of the chip, for example, as the size of the chip and distances between waveguides can be reduced without increasing crosstalk due to the presence of the optical isolators. Design and material of the optical isolators introduce an isolation efficiency. The isolation efficiency depends on the absorption rate of the material and the structure design of the optical isolator to enhance the absorption rate in specific wavelength ranges.

The present disclosure relates to devices, systems, and methods in which an optical isolator is disposed between optical waveguides along a direction. In some embodiments, the optical isolator is designed with vertical and horizontal dimensions that are different than a dimension of at least one of the optical waveguides. For example, in some embodiments, the vertical and horizontal dimensions are greater than vertical and horizontal dimensions of at least one of the waveguides. In various embodiments, the structure of the optical isolator can be a planar structure, a columnar periodic structure, or a grating structure. The material of the optical isolator can be a metallic material or a dielectric material, in some embodiments. In some embodiments, the optical isolator and the optical waveguides of the present disclosure are used in an optical multiplexing system. In this fashion, the optical multiplexing system advantageously incorporates the optical isolator to reduce crosstalk between the optical waveguides compared with conventional structures without an optical isolator. Moreover, dimensions such as the distances between optical waveguides in the system may be reduced without increasing crosstalk due to the presence of the optical isolator.

FIGS. 1A and 1B respectively illustrate a cross-sectional and top plan view of a device 100 having a first waveguide 110, a second waveguide 120, and an optical isolator 130 positioned between the first and second waveguides, in accordance with one or more embodiments of the present disclosure.

The first waveguide 110 has a first length 110a extending along a first direction 11, a first width 110b extending along a second direction 12 that is transverse to the first direction 11, and a first height 110c extending along a third direction 13 that is transverse to the first and second directions. In some embodiments, the first, second, and third directions are orthogonal with respect to one another, as shown in FIGS. 1A and 1B.

In some embodiments, the second waveguide 120 may be aligned with the first waveguide 110 along the second direction 12. The second waveguide 120 has a second length 120a extending along the first direction 11, a second width 120b extending along the second direction 12, and a second height 120c extending along the third direction 13. In some embodiments, the second length 120a of the second waveguide 120 is entirely overlapping the first length 110a of the first waveguide 110 along the second direction 12. In some embodiments, the second length 120a of the second waveguide 120 is greater than the first length 110a of the first waveguide 110. In some embodiments, the first length 110a of the first waveguide 110 is greater than the second length 120a of the second waveguide 120. In some embodiments, the first length 110a of the first waveguide 110 and the second length 120a of the second waveguide 120 are equal or substantially equal.

In some embodiments, the optical isolator 130 is positioned between the first waveguide 110 and the second waveguide 120. For example, as shown in FIGS. 1A and 1B, the optical isolator 130 may be positioned between the first and second waveguides 110, 120 along the second direction 12.

In some embodiments, the optical isolator 130 has a third length 130a extending along the first direction 11, a third width 130b extending along the second direction 12, and a third height 130c extending along the third direction 13.

As shown in FIGS. 1A and 1B, in some embodiments, the first length 110a is equal to the second length 120a. The first width 110b and the second width 120b may be the same in some embodiments, as shown. The first height 110c of the first waveguide 110 may be equal or substantially equal to the second height 120c of the second waveguide 120, in some embodiments, as shown.

The third height 130c of the optical isolator 130 is greater than at least one of the first height 110c of the first waveguide 110 or the second height 120c of the second waveguide 12, in some embodiments. That is, the optical isolator 130 may have a height (i.e., the third height 130c) that is greater than a height of one or both of the first waveguide 110 or the second waveguide 120. As such, as shown in the cross-sectional view of FIG. 1A, the optical isolator 130 may completely overlap with facing surfaces of the first and second waveguides 110, 120, and further may extend beyond the periphery of an area of the facing surfaces of the first and second waveguides 110, 120 along a direction (e.g., along the third direction 13). For example, as shown in FIG. 1A, the optical isolator 130 may have a height that extends beyond upper and lower surfaces of the first and second waveguides 110, 120 along the third direction 13.

In some embodiments, the third length 130a of the optical isolator 130 is greater than at least one of the first length 110a of the first waveguide 110 or the second length 120a of the second waveguide 120. That is, the optical isolator 130 may have a length (i.e., the third height 130a) that is greater than a length of one or both of the first waveguide 110 or the second waveguide 120. As such, as shown in the top view of FIG. 1B, the optical isolator 130 may completely overlap with facing surfaces of the first and second waveguides 110, 120, and further may extend beyond the periphery of an area of the facing surfaces of the first and second waveguides 110, 120. For example, as shown in FIG. 1B, the optical isolator 130 may have a length that extends beyond end surfaces (e.g., left and right ends of the waveguides, as shown in FIG. 1B) of the first and second waveguides 110, 120 along the first direction 11. Such embodiments provide a technical benefit in that an optical isolation zone (e.g., a region or area in which optical crosstalk is reduced or prevented due to the presence of the optical isolator 130) may be extended beyond an area corresponding to areas of the facing surfaces of the first and second waveguides 110, 120. This expanded optical isolation zone may block or otherwise impede unwanted optical signals which may be transmitted, for example, at an oblique angle from an end of one of the first or second waveguides 110, 120. The optical isolator 130 may thus reduce or prevent transmission of such optical signals to other circuitry or components which may be present within the device 100, since the optical isolator 130 may extend beyond the boundaries defined by the first and second waveguides 110, 120.

In some embodiments, the first waveguide 110 and the second waveguide 120 may be parallel with one another, for example, the first and second waveguides 110, 120 may each extend along a same direction (e.g., along the first direction 11 as shown in FIG. 1B). In some embodiments, one or more of the length, width, and height of the first waveguide 110 and the second waveguide 120 can be different from one another. In some embodiments, the second length 120a of the second waveguide 120 may at least partially overlap with the first length 110a of the first waveguide 110 along the second direction 12.

In some embodiments, the first waveguide 110 and the second waveguide 120 may be aligned with one another along the second direction across an entirety of each of the first length 110a and the second length 120a. For example, the first and second waveguides 110, 120 may be aligned with one another (or disposed adjacent to one another) along the second direction 12 with end surfaces of each of the first and second waveguides 110, 120 being aligned with one another. In some embodiments, the first waveguide 110 and the second waveguide 120 may be misaligned.

In some embodiments, the first waveguide 110 and the second waveguide 120 are identical. The first waveguide 110 and the second waveguide 120 may form planar waveguides. In some embodiments, the first waveguide 110 and the second waveguide 120 can be integrated in an optical chip. In some embodiments, the first waveguide 110 and the second waveguide 120 are fiber optic waveguides. For example, the first waveguide 110 and the second waveguide 120 may be fiber optic waveguides which transfer data between multiple nodes of an optical communication link. Optical waves passing through the first waveguide 110 and the second waveguide 120 can be in a same range of wavelengths. In some embodiments, the first waveguide 110 may be different than the second waveguide 120. The optical waves passing through the first waveguide 110 and the second waveguide 120 can be in a different range of wavelengths.

In some embodiments, a distance between the first waveguide 110 and the second waveguide 120 may be very small, and in some cases may be 0 distance or substantially 0 distance, in order to desirably cause an optical interference between the waveguides. Such desired interference may be dependent upon the distance between the waveguides. Accordingly, in some embodiments, the optical device may be designed to have a distance between the waveguides that is varied, for example, along a length of the waveguides. As such, the waveguides may be used to produce an intentional optical interference, for example, to modulate an optical signal passing through the first waveguide 110 with an optical signal passing through the second waveguide 120. In a same fashion, a design of the optical waveguides may create a desirable phase difference between the optical waves beneficial for optical modulation or multiplexing in some embodiments. In some embodiments, such optical interference is unwanted and results in an optical crosstalk between the first waveguide 110 and the second waveguide 120. In this fashion, the optical crosstalk reduces the extinction ratio of the optical device.

The optical isolator 130 prevents or reduces the optical crosstalk between the first waveguide 110 and the second waveguide 120. Optical absorption is a parameter to determine the efficiency of the isolation. The optical absorption depends on the material of the optical isolator 130. In addition, the structure of the optical isolator 130, which determines the optical confinement, may result in trapping optical energy in specific range of wavelengths. Consequently, it may enhance the optical interaction between the optical isolator material and the optical energy. As a result, the isolator material can absorb or reflect a major portion of the optical energy. Enhancing the efficiency of the isolation increases the capability of optical circuit integration, where a greater isolation benefit minimizing the space between the optical elements in the optical chip.

In some embodiments, the third length 130a of the optical isolator 130 is greater than at least one of the first length 110a or the second length 120a along the first direction 11. Increasing the length of the optical isolator can increase the absorption of the optical energy, particularly, at longitudinal edges of the waveguides along the first direction 11. It can reduce the optical interference in connection areas, where one or more optical devices are connected to an end of the optical waveguides. The optical wave passing through the end of a waveguide may be scattered in various directions and increase the optical interferences in those areas. Therefore, increasing the length of the optical isolator can increase the optical interaction between the scattered optical energy and the isolator material, and consequently enhance the optical absorption and the isolation efficiency.

In various embodiments, the third height 130c of the optical isolator 130 is greater than at least one of the first height 110c or the second height 120c along the third direction 13. Increasing the height of the optical isolator can increase the absorption of the optical energy, particularly, at vertical edges of the waveguides along the third direction 13. In general, an optical wave passing through a waveguide is not perfectly confined inside a core of the waveguide due to the imperfect reflection between the core and cladding of the waveguide. This imperfection results in optical energy leakage along the length of the waveguide. The optical energy leakage can be scattered around the edges of the waveguide in the second direction 12 and the third direction 13. It can be a source of interference with other optical objects positioned adjacent to the waveguide. For instance, two waveguides overlapping or aligned with one another (e.g., waveguides which extend along a same direction, such as the first direction 11, and which are aligned with one another along another direction, such as the second direction 12, as shown in FIGS. 1A and 1B) may experience this type of interference when positioned close to each other.

In some devices, an optical isolator disposed between facing waveguides may not reflect or absorb enough optical energy associated with interference as may be desired, for example, the optical isolate may not reflect or absorb the entirety or substantial entirety of optical energy of the interference. The vertical edges of the optical isolator can scatter the optical energy in different directions, that may reduce the isolation efficiency. Increasing the third height 130c of the optical isolator 130 reduces interaction areas between the vertical edges of the first waveguide 110 and the second waveguide 120 along the third direction 13. As a result, enlarging the height of the optical isolator 130 may increase the interaction area between the isolator and the scattered optical energy. Consequently, it can increase the absorption and reflection ratio of the optical isolator 130.

In some embodiments, the optical isolator 130 is spaced apart from the first waveguide 110 along the second direction 12 by a first distance, and in some embodiments, the optical isolator 130 is spaced apart from the second waveguide 120 along the second direction 12 by a second distance 121 as shown in FIG. 1A. In various embodiments, the first distance 111 and the second distance 121 may be the same or different. In some embodiments, the first and second distances 111, 121 may be selected by design to correspond with wavelengths or sub-wavelengths of optical signals which are transmitted by the first and second waveguides 110, 120. For example, the device 100 may be designed with first and second distances 111, 121 which are equal or substantially equal to one wavelength, ½ wavelength, ¼ wavelength, or any other fraction or multiple of the optical wavelengths or sub-wavelengths to produce a desired interference pattern. In some embodiments, where the first and second distances 111, 121 are in a wavelength range, the structure may form an optical cavity which results in optical resonance in specific wavelengths. The optical resonance can increase the interaction between the optical isolator 130 and the optical energy leakage. In some embodiments, the first and second distances 111, 121 may be designed based on sub-wavelengths of the optical signals (e.g., the distances 111, 121 may correspond to the sub-wavelength), where a damping factor of the material as well as the width of the optical isolator 130 along the second direction 12 affect the isolation efficiency.

In some embodiments, the material of the optical isolator 130 may be a conductive material such as aluminum, copper, titanium, titanium nitride, tungsten, metal silicide, aluminum/silicon/copper alloy, or combinations thereof. Spaces around the optical isolator 130 and the waveguides may be filled with inter-metal dielectric (IMD), in some embodiments. For example, the IMD may partially or completely fill a space between ends of the optical waveguides and the optical isolator 130. In some embodiments, the width of the optical isolator 130 along the second direction 12 may be greater than a skin-depth of the conductive material used for the isolator, which may reduce or minimize the transmission of the optical energy through the optical isolator 130. Accordingly, in various embodiments, the selection of the material of the optical isolator 130 may depend on a desired width of the optical isolator 130 along the second direction 12.

Figure 2B:
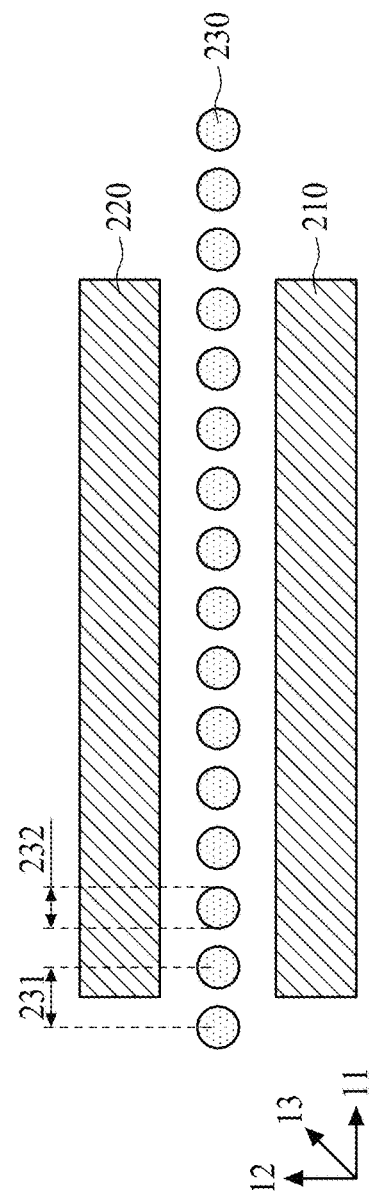
FIG. 2B is a top plan view schematically illustrating relative positioning of the waveguides and the discrete periodic structure of the optical isolator of the device shown in FIG. 2A, in accordance with some embodiments.

FIGS. 2A and 2B respectively illustrate a cross-sectional and a top plan view of a device 200 that includes a first waveguide 210, a second waveguide 220, and a discrete periodic structure 230 as an optical isolator therebetween, in accordance with some embodiments. The characteristics of the first and second waveguides 210, 220 can be same as the first and second waveguides 110, 120 discussed above with respect to FIGS. 1A and 1B. For example, a length of the optical isolator 230 along the first direction 11 may be the same or substantially the same as the third length 130a of the optical isolator 130 along the first direction 11 as previously described herein with respect to FIG. 1B, in some embodiments. In some embodiments, a height of the optical isolator 230 along the third direction 13 may be the same or substantially the same as the third height 130c of the optical isolator 130 along the third direction 13 as previously described herein with respect to FIG. 1A.

Figure 2C:
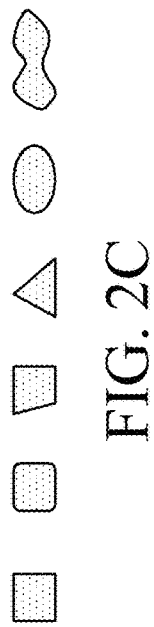
FIG. 2C illustrates different example cross-sectional shapes of unit-cells which may be utilized in the optical isolator of the device shown in FIG. 2B, in accordance with some embodiments.

A structure of the optical isolator 230 is discretized along the first direction 11, in some embodiments, as shown in FIG. 2B. In some embodiments, the optical isolator 230 has a periodic structure along the first direction 11. The periodic structure may include a plurality of unit-cells periodically arranged in the first direction 11. The shape and size of all unit-cells may be the same in some embodiments. A distance between the unit-cells is a period 231 of the periodic structure. In some embodiments, the period 231 is same for all the unit-cells along the first direction 11; however, embodiments are not limited thereto, and in some embodiments, adjacent unit-cells of the optical isolator 230 may be spaced apart from one another by various different distances. The cross-sectional shape of the unit-cells may be circular, in some embodiments. Each of the unit-cells may form a rod or column, in some embodiments, and may have a length or long axis extending along the third direction 13, as shown in FIG. 2A. As shown in FIG. 2C, a circular cross-section of a unit-cell of the optical isolator 230 may have a first diameter 232.

The periodic structure can be designed to absorb a specific range of the optical wavelengths. The periodic structure can block a range of wavelengths from passing through the structure. The range of the wavelengths that is blocked with the period structure is a bandgap. In various embodiments, the device 200 may be designed to have a bandgap that is based on the period 231 and the diameter 232 of the optical isolator 230. In some embodiments, the optical isolator 230 may be designed to have a periodic structure which isolates or blocks transmission of a desired range of wavelengths, while allowing desirable transmission or interference in other ranges of wavelengths. Such embodiments enables integration of multi-functional optical devices in a single structure design. For instance, the periodic structure can be designed to isolate a range of wavelengths that transfer data between the optical elements, while allowing interference of a range of wavelengths for the purpose of multiplexing or modulating the optical waves.

The periodic structure can increase the absorption of the optical energy, due to the optical resonance between the unit-cells. The optical resonance creates standing waves in a specific range of wavelengths. Accordingly, the standing wave increases an interaction time between the rods and trapped optical energy. As a result, a longer interaction time increases the absorption. In some embodiments, the period 231 and the diameter 232 can be variable along the first direction 11. In such embodiments, the periodic structure can isolate a first range of the wavelengths while allowing interference of a second range of the wavelengths in a first period and diameter along the first direction 11. Moreover, in some embodiments, the periodic structure can isolate the second range of the wavelengths while allowing interference of the first range of the wavelengths in a second period and diameter along the first direction 11. Therefore, the periodic structure may form an adjustable optical isolator, in some embodiments. The period and the diameter of the rod may have dimensions that are selected by design in order to suitably isolate a specific range of the wavelengths in a specific part of the optical chip.

In some embodiments, a material of the optical isolator 230 may be a conductive material such as aluminum, copper, titanium, titanium nitride, tungsten, metal silicide, aluminum/silicon/copper alloy, or combinations thereof. Spaces between the rods, around the optical isolator 230 and the waveguides may be filled with inter-metal dielectric (IMD). In some embodiments, a dielectric with different permittivity may be placed between the unit-cells, rather that the IMD surrounded the optical isolator 230 and the waveguides. In this fashion, the dielectric may have greater absorption rate than IMD. In some examples, the dielectric can be titania (TiO$_2$). The optical energy concentration is maximum in the space between the unit-cells. Hence, utilizing an absorber dielectric in that space may result in a perfect absorption response in a specific range on the wavelengths.

FIG. 2C illustrates various cross-sectional shapes of unit-cells which may be utilized in an optical isolator, for example the optical isolator 230 of the device 200 shown in FIG. 2B. The shape of the cross-section of each unit-cell can be any shape, and may be different than the circular shape as shown in FIG. 2B. For instance, the cross-sectional shape can be polygonal, e.g., hexagonal, pentagonal, square, rectangular, trapezoidal or triangular. The cross-sectional shape can also not be polygonal, e.g., elliptical, or can be non-symmetrical such as that illustrated in the last image of FIG. 2C. The unit cells can also comprise a combination of different shapes. Different shapes can be selected based on the fabrication feasibility. Further, the shape of the unit-cells can be designed based on the desired wavelengths and absorption rate.

Figure 3A:
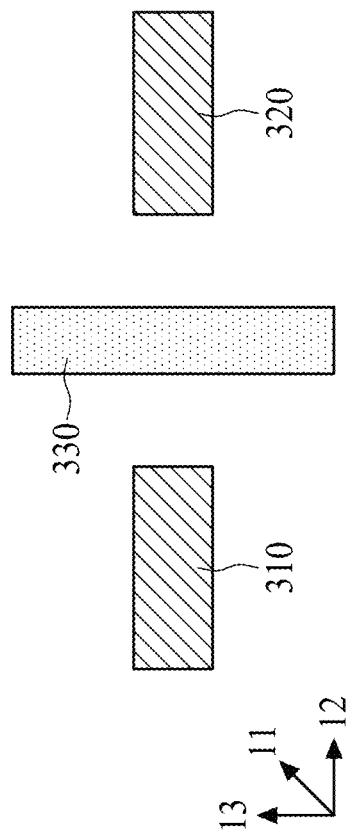
FIG. 3A is a cross-sectional view schematically illustrating a device having waveguides and a multi-array discrete periodic structure as an optical isolator therebetween, in accordance with some embodiments.
Figure 3B:
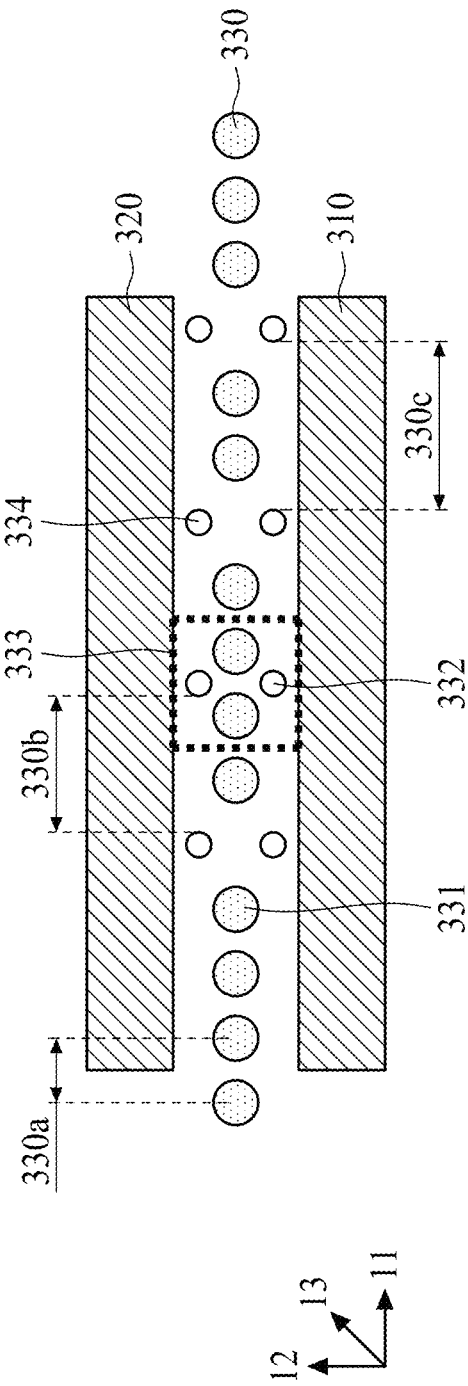
FIG. 3B is a top plan view schematically illustrating relative positioning of the waveguides and the multi-array discrete periodic structure of the optical isolator of the device shown in FIG. 3A, in accordance with some embodiments.

FIGS. 3A and 3B respectively illustrate a cross-sectional and top plan view of a device 300 that includes a first waveguide 310, a second waveguide 320, and a discrete periodic structure 330 as an optical isolator therebetween, in accordance with some embodiments. The characteristics of the waveguides 310 and 320 can be same as the waveguides 110 and 120 discussed above for the FIGS. 1A-B. A length of the optical isolator 330 is same the third length 130a along the first direction 11. A height of the optical isolator 330 is same as the third height 130c along the third direction 13. A structure of the optical isolator 330 is discretized along the first direction 11.

The waveguides of the device 300 may be the same or substantially the same as previously described herein, and may include a multiple-arrays of discrete periodic structure as an optical isolator therebetween. For example, one or more arrays of periodic structures (e.g., each array may form a layer of a periodic structure) may be added to the discrete period structures of FIGS. 2A and 2B along the second direction 12. For instance, the optical isolator 330 may include a first periodic structure 331 positioned at the center of a space between the first waveguide 310 and the second waveguide 320. A portion of the optical isolator 330 along the first direction 11 further includes a second periodic structure 332 positioned between the first periodic structure 331 and the first waveguide 310, and a third periodic structure 334 positioned between the first periodic structure 331 and the second waveguide 320, along the second direction 12.

In some embodiments, the second periodic structure 332 and the third periodic structure 334 can be aligned along the first direction 11. In this fashion, a period 330b of the second periodic structure 332 may be the same as a period 330c of the third periodic structure 334. In some examples, the period 330b can be different than the period 330c. A period of the first periodic structure 331 may be the same as the period 330a of the second embodiment in FIGS. 2A-B. The period 330b and 330c can be greater than the period 330a. A unit-cell of all three of the periodic structures may include a rod or column. A height of the rods may be same for all the periodic structures. The height of the rods may be greater than at least one of the heights of the first waveguide 310 or the second waveguide 320.

In some embodiments, each rod or column of the unit-cells of the first, second, and third periodic structures has a circular cross-section in the plane of first and second directions. The circular cross-section of the periodic structure 331 has a first diameter 331d. The circular cross-section of the periodic structure 332 has a first diameter 332d. The circular cross-section of the periodic structure 334 has a first diameter 334d. In some examples, the diameter 331d is greater than at least one diameters 332d and 334d. The diameter 332d can be same as the diameter 334d.

In some embodiments, the second periodic structure 332 and the third periodic structure 334 may be positioned in an arrangement that at least partially fills gaps between the unit-cells of the first periodic structure 331 along the first direction 11. The period 231 may be enlarged or reduced in a portion in which the second periodic structure 332 and the third periodic structure 334 are positioned. In this fashion, all three periodic structures can form a single periodic structure 333, which the unit-cells include two rods of the first periodic structure 331 along the first direction 11, one rod of the second periodic structure 332 positioned between the first waveguide 310 and the first periodic structure 331 along the second direction 12, and one rod of the third periodic structure 334 positioned between the second waveguide 320 and the first periodic structure 331 along the second direction 12. The periodic structure 333 can be repeated along the first direction 11, only in a portion of the optical isolator 330. The periodic structure 333 can provide optical isolation of a specific range of the wavelengths, in a specific area of the waveguides along the first direction 11. Spaces between the unit-cells and the waveguides can be filled with IMD. As discussed above for the second embodiment in FIGS. 2A-B, a dielectric with different permittivity may be place between the unit-cells, rather that the IMD. A material of the optical isolator 330 can be same as the material of the optical isolator 230 described above. In some examples, a material of the second periodic structure 332 and the third periodic structure 334 can be different than the material of the first periodic structure 331.

Figure 4A:
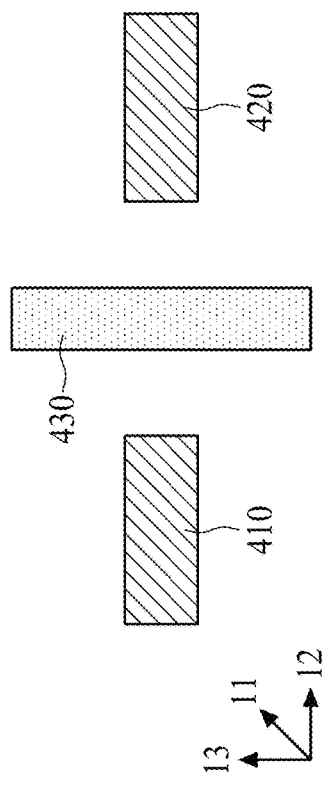
FIG. 4A is a cross-sectional view schematically illustrating a device having waveguides and a grating periodic structure as an optical isolator therebetween, in accordance with some embodiments.
Figure 4B:
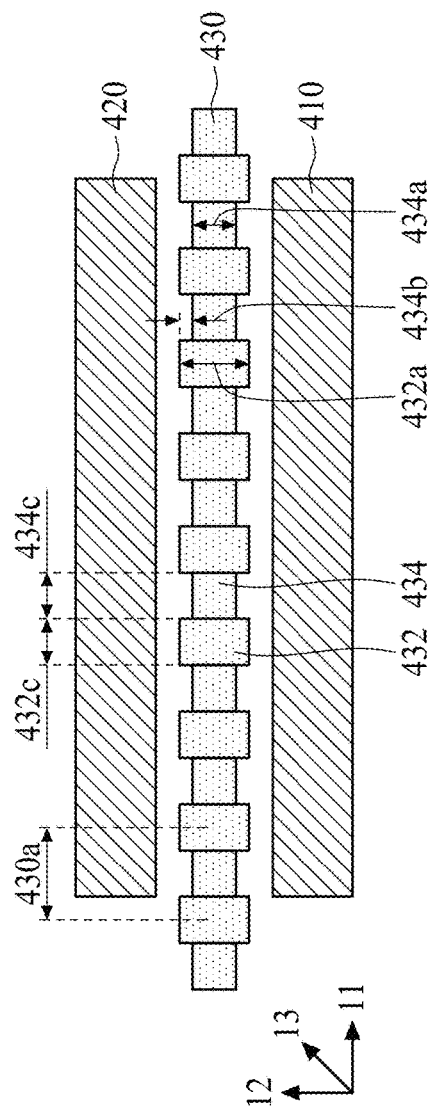
FIG. 4B is a top plan view schematically illustrating relative positioning of the waveguides and the grating periodic structure of the optical isolator of the device shown in FIG. 4A, in accordance with some embodiments.

FIGS. 4A and 4B respectively illustrate a cross-sectional and a top plan view of a device 400 that includes a first waveguide 410, a second waveguide 420, and a grating periodic structure 430 as an optical isolator therebetween, in accordance with some embodiments. The characteristics of the waveguides 410 and 420 can be same as the waveguides 110 and 120 discussed above with respect to FIGS. 1A and 1B. A length of the optical isolator 430 is same the third length 130a along the first direction 11. A height of the optical isolator 430 is same as the third height 130c along the third direction 13.

The grating period structure 430 includes a plurality of columnar structures 432 arranged along the first direction 11. Each of the plurality of columnar structures 432 is connected to an adjacent column with a joint 434 along the first direction 11. The columnar structure has a width 432a that is greater than a width 434a of the joints 434. The width 434a can be same as the width of the optical isolator 130 in the first embodiment of FIGS. 1A-B. The height of the columnar structures and the joints can be same, and greater than the height of at least one of the first waveguide 410 or the second waveguide 420. The height of the columnar structures and joints can also be different, and greater than the height of at least one of the first waveguide 410 or the second waveguide 420. The columnar structures are periodically repeated with a period 430a along the first direction 11. The period 430a can be designed based on the desired wavelengths to be isolated. In some examples, the period 430a is variable along the first direction 11 to isolate different range of wavelengths. A difference 434b between the width 432a and the width 434a is a design flexibility to adjust the structure for a specific range of wavelengths. The difference 434b is the width of a gap which traps the optical energy with the specific wavelength, and consequently increases an interaction between the optical energy and the isolator 430. In some examples, the columnar structure has a length 432c that is greater than a length 434c of the joints 434 along the first direction 11. The period 430a may be same as a summation of the lengths 432c and 434c. An isolator material can be same as the optical isolators in the embodiments of FIGS. 1A-B described above.

Figure 4C:
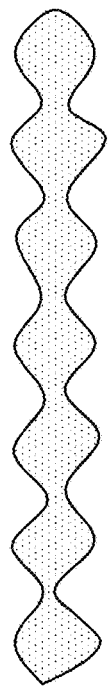
FIG. 4C illustrates an undulating cross-sectional shape which may be utilized as the periodic structure of the device shown in FIG. 4B, in accordance with some embodiments.

FIG. 4C shows undulating cross-sectional shape of the periodic structure in FIG. 4B. The shape of the cross-section of each unit-cell can be different than a straight-line shape. For instance, the cross-sectional shape can have a surface defined by curved lines with different peaks and valleys. The peaks and valleys can be repeated with a period to form a periodic structure. Although such a periodic structure can exhibit lower quality factor than a periodic structure in FIG. 2B, a non-uniform boundary may enhance a damping factor and absorption rate in a specific wavelength range. The period and shape of the unit-cells can be designed based on the desired wavelength and absorption rate.

Figure 5A:
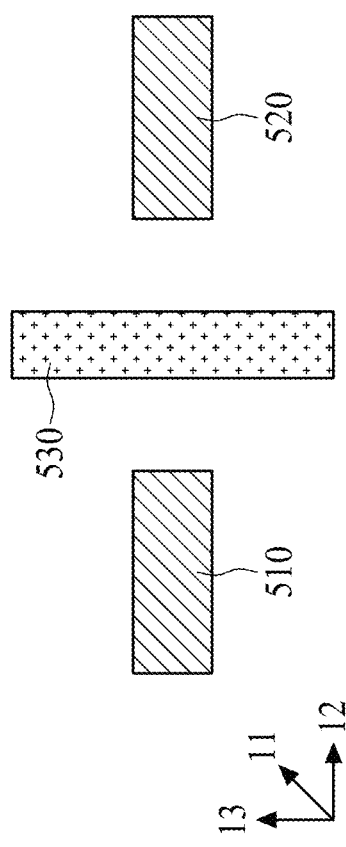
FIG. 5A is a cross-sectional view schematically illustrating a device having waveguides and a dielectric optical isolator therebetween, in accordance with some embodiments.
Figure 5B:
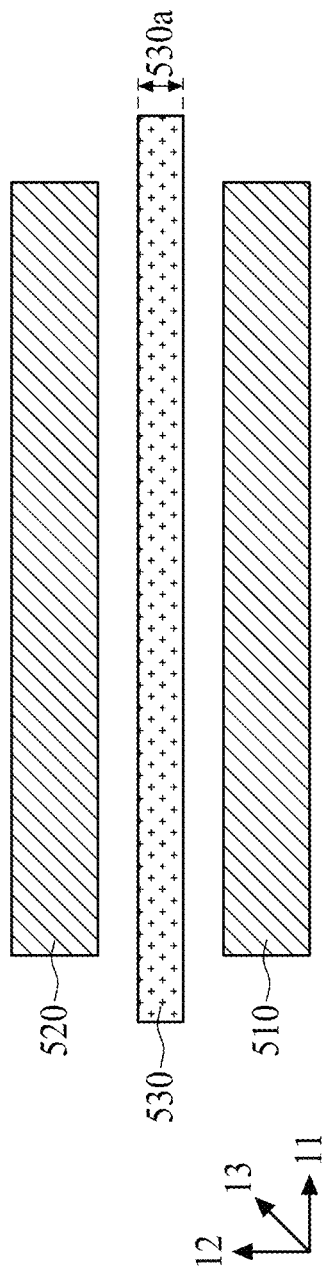
FIG. 5B is a top plan view schematically illustrating relative positioning of the waveguides and the dielectric optical isolator of the device shown in FIG. 5A, in accordance with some embodiments.

FIGS. 5A and 5B respectively illustrate a cross-sectional and a top plan view of a device 500 that includes first waveguide 510, a second waveguide 520, and an optical isolator 530 therebetween, in accordance with some embodiments. The characteristics of the waveguides 510 and 520 can be same as the waveguides 110 and 120 discussed above, e.g. with respect to FIGS. 1A and B. A length of the optical isolator 530 is same the third length 130a along the first direction 11. A height of the optical isolator 530 is same as the third height 130c along the third direction 13. In some embodiments, the material of the optical isolator 530 is different that the material of the first waveguide 510 and the second waveguide 520. The material of the optical isolator 530 can be a dielectric having an absorption rate. A width 530a of the optical isolator 530 along the second direction 12 can be designed based on the absorption rate of the material. A thinner width 530a can be designed for a material with higher absorption rate. The dielectric has a dielectric constant in a specific range of the wavelengths. The dielectric constant of the dielectric optical isolator 530 can be less than a dielectric constant of at least one of the first waveguide 510 and the second waveguide 520.

FIGS. 6A-6E illustrate a method of manufacturing the optical waveguides 110, 120 and the optical isolator 130 described in FIGS. 1A-1B. A method of manufacturing of the embodiments of FIGS. 2A-5B may be the same as the method described in FIGS. 6A-6E with the exception the pattern of the structure forming the optical isolator will vary. In various embodiments, the optical waveguides 110, 120 and the optical isolator 130 may be formed in a dielectric material 600. The dielectric material 600 may be an inter-metal dielectric (IMD) layer. In some examples, the IMD layer may include titanium nitride, silicon nitride, or titanium oxide. In some embodiments, a semiconductor substrate may be used instead of the dielectric material 600.

Figure 6A:
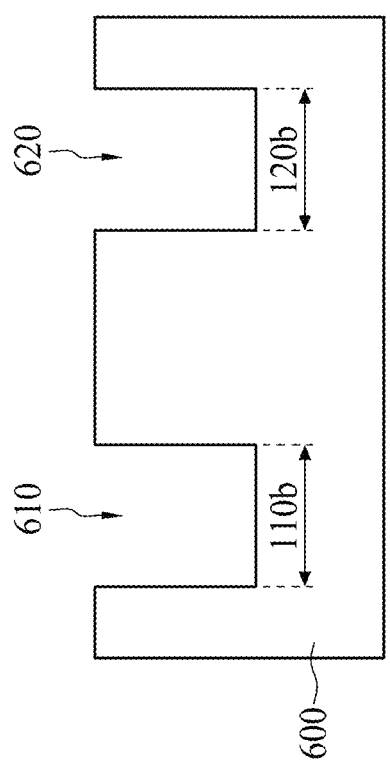

FIG. 6A illustrates forming trenches 610, 620 in which the optical waveguides 110, 120 will be formed. The location of the trenches 610, 620 may be patterned on the dielectric material 600 by a photolithography method. Then the trenches 610, 620 may be formed by an etching process. A width of the trench 610 may be same as the width 110b of the optical waveguide 110 and a width of the trench 620 may be same as the width 120b of the optical waveguide 120 along the second direction 12. In some examples, the etching process may include any suitable etching technique such as wet etching, dry etching, RIE, ashing, and/or other etching methods. For example, a dry etching process may implement an oxygen containing gas, a fluorine-containing gas (e.g., $CF_4$, SF, CH, F2, $CHF_3$, and/or $C_2F_6$), a chlorine-containing gas (e.g., $Cl_2$, $CHCl_3$, $CCl_4$, and/or BClz), a bromine-containing gas (e.g., HBr and/or $CHBr_3$), an iodine-containing gas, other suitable gases and/or plasmas, and/or combinations thereof. For example, a wet etching process may comprise etching in diluted hydrofluoric acid (DHF); potassium hydroxide (KOH) solution; ammonia; a solution containing hydrofluoric acid (HF), nitric acid ($HNO_3$), and/or acetic acid ($CH_3COOH$); or other suitable wet etchants.

Figure 6B:
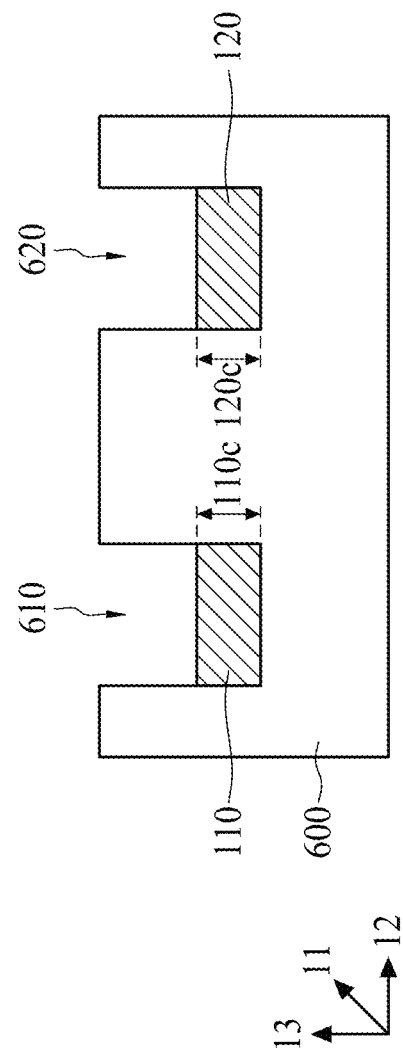

FIG. 6B illustrates a step of forming the optical waveguides 110, 120 inside the trenches 610, 620. In some examples, the optical waveguides 110, 120 may be formed by depositing a dielectric material using processes such as a chemical vapor deposition (CVD) process, a sub-atmospheric CVD (SACVD) process, a flowable CVD process, an atomic layer deposition (ALD) process, a physical vapor deposition (PVD) process, or other suitable process. The deposited dielectric material may be recessed in trenches 610, 620 by a combination of planarizing processes, e.g., CMP and etching processes. In some embodiments, a semiconductor substrate may be patterned instead of the dielectric material 600. In this fashion, the optical waveguides 110, 120 may include an oxide layer (e.g., $SiO_2$) formed by oxidizing exposed surfaces of the substrate. The oxidation process results in the oxide layer having a determined thickness. In some embodiments, the oxidation process comprises a rapid thermal oxidation (RTO) process, high pressure oxidation (HPO), chemical oxidation process, in-situ stream generation (ISSG) process or enhanced in-situ stream generation (EISSG) process. The height 110c of the optical waveguide 110 and the height 120c of the optical waveguide 120 along the third direction 13 are the same as described in FIGS. 1A-1B.

FIG. 6C illustrates a step of forming a trench 630 in which the optical isolator 130 will be formed, placing it between the optical waveguides 110, 120. The position of trench 630 for the optical isolator 130 may be patterned on the dielectric material 600 by a photolithography method. Then the trench 630 may be formed by an etching process same as the etching process described in FIG. 6A. A width of the trench 630 may be same as the width 130b of the optical isolator 130. In some examples, a portion of the trenches 610, 620 over the optical waveguides 110 and 120 may be filled by a dielectric material prior to the etching of the trench 630.

FIG. 6D illustrates a step of forming the optical isolator 130 inside the trench 630. In some examples, the optical isolator 130 may be formed by a combination of deposition, patterning and/or etching steps to fill 630 with a metal layer. Examples of suitable deposition processes include chemical vapor deposition (CVD) process, a sub-atmospheric CVD (SACVD) process, a flowable CVD process, an atomic layer deposition (ALD) process, a physical vapor deposition (PVD) process, or other suitable process. The height 130c of the optical isolator 130 is the same as described in FIGS. 1A-1B.

FIG. 6E illustrates a step of filling portions of the trenches 610, 620, and 630 with a dielectric material such as the dielectric material 600. In some examples, the trenches 610, 620, and 630 may be filled by depositing a dielectric material using processes such as a chemical vapor deposition (CVD) process, a sub-atmospheric CVD (SACVD) process, a flowable CVD process, an atomic layer deposition (ALD) process, a physical vapor deposition (PVD) process, or other suitable process.

Figure 7:
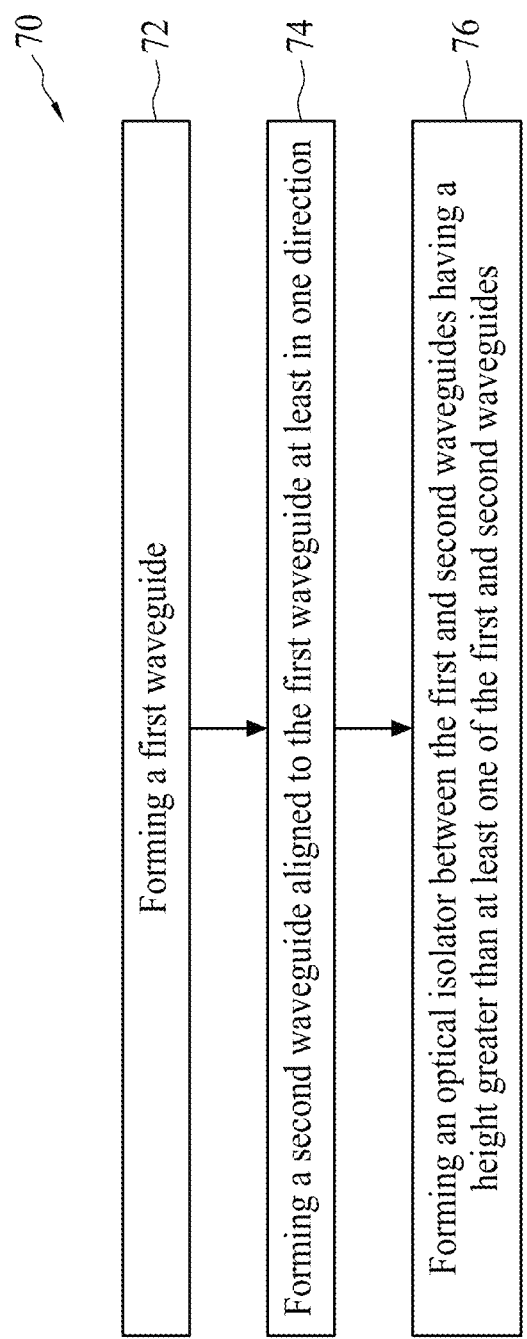
FIG. 7 is a flowchart schematically illustrating a method to create the waveguides and the optical isolator described in FIGS. 1-5, in accordance with some embodiments.

FIG. 7 is a flowchart 70 of a method to create the waveguides and the optical isolator of embodiments described above. In some embodiments, the first and second waveguides of a device according to any embodiments described herein, for example, with respect to FIGS. 1-5, may be formed on a substrate, such as a silicon substrate, glass substrate, or any suitable substrate. In some examples, the method of the flowchart 70 may follow the manufacturing methods described in FIGS. 6A-6E. At 72 a first waveguide is formed. At 74, a second waveguide is formed, where the second waveguide is aligned to the first waveguide in at least in one direction. For example the lengths of the first waveguide and the second waveguide maybe parallel. The waveguides may be formed in any suitable form or by any suitable techniques, such as those describe above with reference to FIGS. 6A-6E, and in some embodiments, waveguides and the substrate can be processed on a semiconductor wafer. For example, the waveguides may be formed on a silicon or other semiconductor chip, which may include any of a variety of optical, electrical, insulative, or conductive features. The waveguides may be a part of some optical devices. In some examples, the waveguides may connect different optical devices inside an optical chip.

At 76, an optical isolator is formed with a desired length, width, height, and material as described above. As described above, the height of the optical isolator may be greater than at least one of the waveguides. In embodiments in which the waveguides are formed on a semiconductor wafer, a trench may be etched in a place that the optical isolator will be positioned, as described in FIG. 6C. In this fashion, the material of the optical isolator can fill the trench, where a depth of the trench past the end of at least one of the waveguides, as described in FIG. 6C.

In some embodiments, the substrate of the first waveguide can be separated from the substrate of the second waveguide. In some embodiments, the optical isolator may be positioned in a space between the waveguides and the corresponding substrates. In some examples, the optical isolator may be formed on a substrate different than the substrates of the waveguides. Spaces between the optical isolator and the waveguides may be filled with inter-metal dielectric (IMD) materials.

Figure 8:
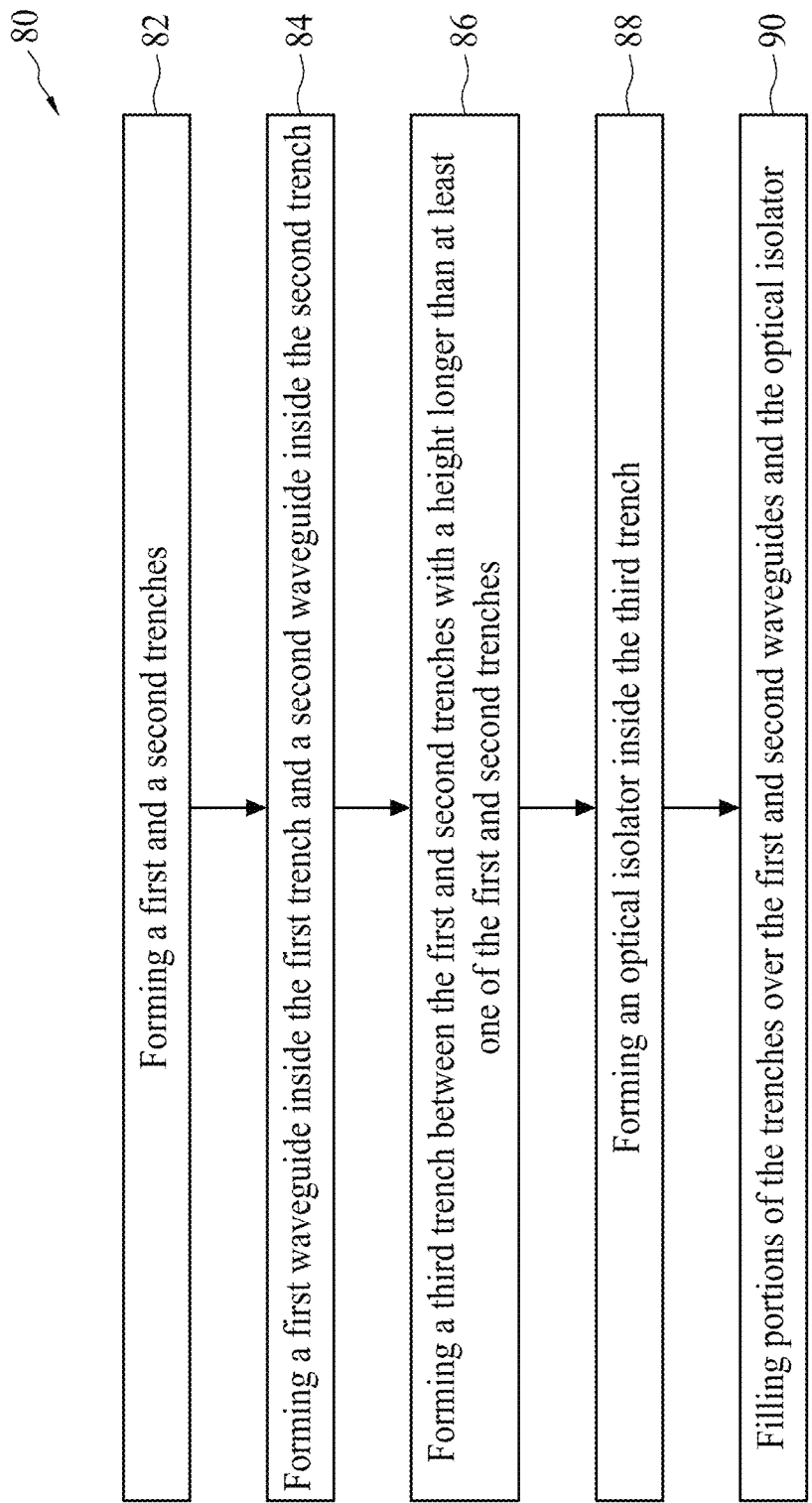
FIG. 8 is a flowchart schematically illustrating a method of manufacturing waveguides and the optical isolator described in FIGS. 6A-6E, in accordance with some embodiments.

FIG. 8 is a flowchart 80 of a method to create the waveguides and the optical isolator of embodiments described above, according to the manufacturing process described in FIGS. 6A-6E. At 82, two trenches are formed to create the first and second waveguides. The trenches may be formed by an etching process described in FIG. 6A. At 84, the first and second waveguides are formed inside the first and second trenches. The first and second waveguides may be formed by a deposition process described in FIG. 6B. At 86, a third trench is formed to create the optical isolator. The third trench may be formed by an etching method as described in FIG. 6C. To form the optical isolator with a height greater than at least one of the first and second waveguides, the third trench has a depth greater than the first and second trenches. Thus, the third trench may be formed in a separate etching step than forming the first and second trenches. At 88, the optical isolator is formed inside the third trench. The optical isolator may be formed by a deposition method as described in FIG. 6D. Finally, at 90, portions of the first, second, and third trenches over the first and second waveguides and the optical isolator are filled by a dielectric material. The step 90 corresponds to the method described in FIG. 6E.

The optical waveguides and the optical isolator described above, can be a part of an optical multiplexing system. The multiplexing system may be a wavelength division multiplexing (WDM) system. The WDM system can include dense wavelength division multiplexing (DWDM), coarse wavelength division multiplexing (CWDM), medium wavelength division multiplexing (MWDM), or Lan wavelength division multiplexing (LWDM).

Figure 9:
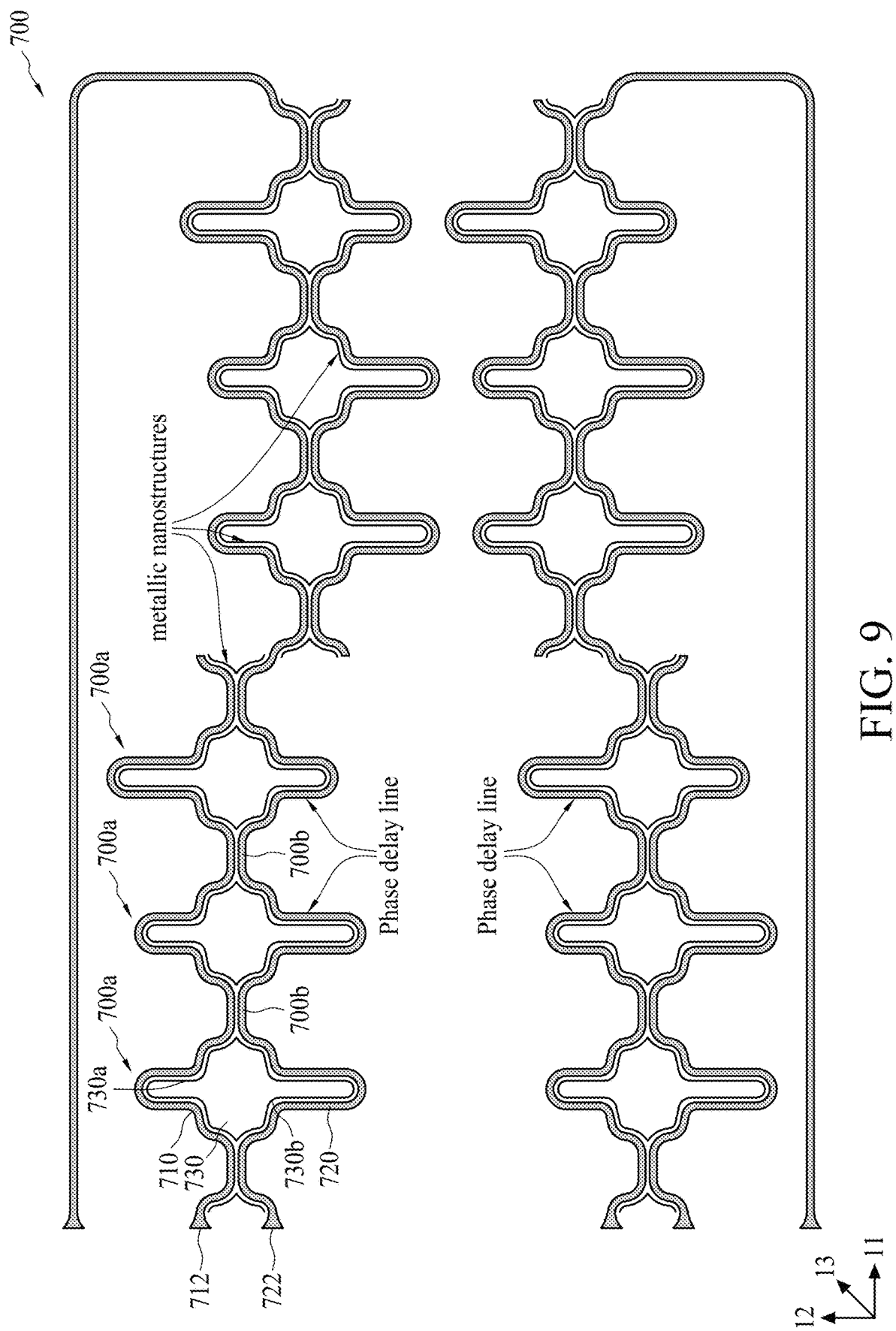
FIG. 9 is a top plan view schematically illustrating an optical multiplexing device including optical waveguides and optical isolators, in accordance with some embodiments.

FIG. 9 shows a top plan view of an optical multiplexing device 700 including optical waveguides and optical isolators. In some examples the optical multiplexing device 700 may be a CWDM system. The material and the design of the waveguides and the optical isolators can be same as previously described, for example, with respect to FIGS. 1-5.

In some embodiments, a first waveguide 710 guides a first optical wave with a first wavelength. A second waveguide 720 guides a second optical wave with a second wavelength. An optical isolator 730 is positioned between the first waveguide 710 and the second waveguide 720 along the second direction 12. The first optical wave and the second optical wave may propagate inside the corresponding waveguides along the first direction 11. The first wavelength and the second wavelength can be same. In some examples the first wavelength and the second wavelength may be different.

In some embodiments, the first waveguide has a length 710L along the first direction 11, the second waveguide 720 has a second length 720L along the first direction 11, and the optical isolator 730 has a third length 730L along the first direction 11. In some examples, the first length 710L entirely is greater than the second length 720L. In some examples, the multiplexing device 700 may include a plurality of segments 700a arranged along the first direction 11. In this fashion, the first length 710L is greater than the second length 720L in some segments along the first direction, while the first length 710L is less than the second length 720L in other segments along the first direction 11. The first length 710L and the second length 720L may be same in some portions between the segments along the first direction 11.

A distance between the first waveguide 710 and the second waveguide 720 along the second direction may be variable for each segment along the first direction 11. The distance may be constant in a portion 700b between the segments 700a along the first direction 11. The optical isolator 730 is positioned in a space between the first waveguide 710 and the second waveguide 720 for each segment. The portion 700b between the segments may be free from the optical isolator 730, e.g., the optical isolator has not been formed at portion 700b or has been formed and removed. The first optical wave may interfere with the second optical wave in the portion 700b between the segments. The interference between the first optical wave and the second optical wave may be constructive or destructive. The type of the interference depends on the difference between the first length 710L and the second length 720L for each segment along the first direction 11. The difference between the first length 710L and the second length 720L results in a phase difference between the first and the second optical waves. The phase difference is a parameter that affects the multiplexing process.

In various embodiments, the optical isolator 730 includes two layers separated along the second direction 12. In this fashion, a first layer 730a is in proximity of the first waveguide 710 and a second layer 730b is in proximity of the second waveguide 720. A space between the first layer 730a and the second layer 730b can be filled with inter-metal dielectric (IMD) material. The first layer 730a and the second layer 730b may be connected to each other at a start and end points of each segment. In some examples, a distance between the first layer 730a and the first waveguide 710 and a distance between the second layer 730b and the second waveguide 720 can be same along the first direction 11. Alternatively, the optical isolator 730 can be a straight line whether the waveguides being straight line or having not-straight shape.

In some embodiments, the first optical wave is coupled to the first waveguide 710 with a first grating coupler 712 and the second optical wave is coupled to the second waveguide 720 with a second grating coupler 722. In some examples, the multiplexing device 700 includes more than two waveguides. For optical multiplexing operation, a zero interference between the first optical wave and the second optical wave is desired along the segments 700a. To reduce the interference between the waveguides along the segments 700a, a minimum distance between the first waveguide 710 and the second waveguide 720 should be greater than a threshold. The threshold can be reduced when an optical isolator is placed between the optical waveguides. Enhancing the isolation by changing design and material of the optical isolator benefits the reduction of the threshold. Consequently, a total size of the optical chip is reduced by utilizing a highly efficient optical isolator.

FIG. 10A shows a simulation environment of a device having a two waveguides and an optical isolator therebetween, in accordance with some embodiments described above. The simulation environment includes a first waveguide 810, a second waveguide 820, and an optical isolator 830 with similar characteristics described in FIGS. 1A-B of the embodiments. In this fashion, a length of the waveguides 810 and 820 is 30 µm along the first direction 11. A distance between the waveguides is 3 µm along the second direction 12. The simulation is performed to compare a frequency response of two different conditions, with and without a metallic optical isolator.

FIG. 10B shows simulation results of optical crosstalk between the waveguides and optical transmission of the waveguides in a normalized range of the wavelengths, in accordance with some embodiments described above. The simulation results confirm that the structure with an optical isolator designed in the present disclosure can reduce the crosstalk between the waveguides by a range between 10-30 dB compared with a conventional structure without a metallic optical isolator. The results also show that the optical transmission along the waveguides is close to a perfect transmission. In this fashion, the optical structure works as a lossless medium over the working wavelengths.

FIG. 10C shows simulation results indicating that nearly lossless transmission is achieved by simulation of the device illustrated in FIG. 10A, in accordance with some embodiments.

Embodiments of the present disclosure provide devices, systems, and methods in which an optical isolator is disposed between adjacent optical waveguides, for example, of an optical device or chip. In some embodiments, the optical isolator is designed with vertical and horizontal dimensions that are different than a dimension of at least one of the optical waveguides. For example, in some embodiments, the vertical and horizontal dimensions are greater than vertical and horizontal dimensions of at least one of the waveguides.

In various embodiments, the structure of the optical isolator can be a planar structure, a columnar periodic structure, or a grating structure. The material of the optical isolator can be a metallic material or a dielectric material, in some embodiments. In some embodiments, the optical isolator and the optical waveguides of the present disclosure are used in an optical multiplexing system. Embodiments of the present disclosure may reduce crosstalk between the optical waveguides due to the optical isolator, which facilitates reduction of dimensions such as the distances between optical waveguides without increasing crosstalk.

In one or more embodiments, a device includes a first waveguide having a first length extending along a first direction, a first width extending along a second direction that is orthogonal to the first direction, and a first height extending along a third direction that is orthogonal to the first and second directions. A second waveguide is aligned with the first waveguide along the first direction, and the second waveguide has a second length extending along the first direction, a second width extending along the second direction, and a second height extending along the third direction. The second length of the second waveguide entirely overlaps with the first length of the first waveguide along the second direction. An optical isolator is disposed between the first waveguide and the second waveguide. The optical isolator has a third length extending along the first direction, a third width extending along the second direction, and a third height extending along the third direction. The third height is greater than at least one of the first height or the second height, and the optical isolator is formed of a material that is different from a material of the first waveguide or a material of the second waveguide.

In one or more embodiments, a method includes: forming a first waveguide having a first length extending along a first direction, a first width extending along a second direction that is orthogonal to the first direction, and a first height extending along a third direction that is orthogonal to the first and second directions. The method further includes forming a second waveguide aligned with the first waveguide along the first direction, the second waveguide having a second length extending along the first direction, a second width extending along the second direction, and a second height extending along the third direction. The second length of the second waveguide entirely overlaps the first length of the first waveguide along the second direction. The method includes forming an optical isolator between the first waveguide and the second waveguide. The optical isolator having a third length extending along the first direction, a third width extending along the second direction, and a third height extending along the third direction, the third height being greater than at least one of the first height or the second height. The optical isolator is formed of a material that is different from a material of the first waveguide or a material of the second waveguide.

In one or more embodiments, a multiplexing device is provided that includes a first waveguide having a first length extending along a first direction, a first width extending along a second direction that is orthogonal to the first direction, and a first height extending along a third direction that is orthogonal to the first and second directions. The multiplexing device includes a second waveguide that is aligned with the first waveguide along the first direction. The second waveguide includes a second length extending along the first direction, a second width extending along the second direction, and a second height extending along the third direction. The second length of the second waveguide is greater than the first length of the first waveguide. An optical isolator is partially positioned between the first waveguide and the second waveguide. The optical isolator has a third length extending along the first direction, a third width extending along the second direction, and a third height extending along the third direction. The third height of the optical isolator being greater than at least one of the first height or the second height. The optical isolator is formed of a material that is different from a material of the first waveguide or a material of the second waveguide.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
   a first waveguide having a first length extending along a first direction, a first width extending along a second direction that is orthogonal to the first direction, and a first height extending along a third direction that is orthogonal to the first and second directions;
   a second waveguide aligned with the first waveguide along the first direction, the second waveguide having a second length extending along the first direction, a second width extending along the second direction, and a second height extending along the third direction, the second length of the second waveguide entirely overlapping the first length of the first waveguide along the second direction; and
   an optical isolator between the first waveguide and the second waveguide, the optical isolator having a third length extending along the first direction, a third width extending along the second direction, and a third height extending along the third direction, the third height being greater than at least one of the first height or the second height, the optical isolator being formed of a material that is different from a material of the first waveguide or a material of the second waveguide, wherein the optical isolator is a discrete periodic structure of a plurality of rods, the discrete periodic structure extending along the first direction.

2. The device in claim 1, wherein the third length is greater than the first length and the second length, and the third width is less than at least one of the first width or the second width.

3. The device in claim 1, wherein each of the plurality of rods has a circular cross-sectional shape.

4. The device in claim 1, wherein each of the plurality of rods has a circular cross-sectional shape and a dimension of each of the plurality of rods is same for each of the plurality of rods.

5. The device in claim 1, wherein the plurality of rods includes a first plurality of rods that has a first cross-sectional shape and a second plurality of rods that has a second cross-section shape, the first cross-sectional shape being different than the second cross-sectional shape.

6. The device in claim 1, wherein at least some of the plurality of rods have a polygonal cross-sectional shape.

7. The device in claim 1, wherein the discrete periodic structure includes a multi-array discrete periodic structure.

8. The device in claim 7, wherein a dimension of the rods in first and second arrays of the multi-array discrete periodic structure is less than a dimension of the rods in a third array of the multi-array discrete periodic structure that is between the first and second arrays.

9. The device in claim 1, wherein the discrete periodic structure includes a plurality of rods distributed in the first direction and the second direction.

10. The device in claim 9, wherein the distribution of the rods in the second direction comprising multiple arrays, wherein a dimension of the rods in arrays closer to the first and second waveguides is less than a dimension of the rods in a central array.

11. The device in claim 1, wherein the isolator includes a metallic material, and an inter-metal dielectric (IMD) surrounds the isolator and the first and second waveguides.

12. The device in claim 1, wherein the isolator includes a dielectric material.

13. A method, comprising:
    forming a first waveguide having a first length extending along a first direction, a first width extending along a second direction that is orthogonal to the first direction, and a first height extending along a third direction that is orthogonal to the first and second directions;
    forming a second waveguide aligned with the first waveguide along the first direction, the second waveguide having a second length extending along the first direction, a second width extending along the second direction, and a second height extending along the third direction, the second length of the second waveguide entirely overlapping the first length of the first waveguide along the second direction; and
    forming an optical isolator between the first waveguide and the second waveguide, the optical isolator having a third length extending along the first direction, a third width extending along the second direction, and a third height extending along the third direction, the third height being greater than at least one of the first height or the second height, the optical isolator being formed of a material that is different from a material of the first waveguide or a material of the second waveguide, wherein the optical isolator is a discrete periodic structure, and the discrete periodic structure includes a plurality of rods extending along the first direction.

14. The method of claim 13, wherein the third length is greater than the first length and the second length, and the third width is less than at least one of the first width or the second width.

15. The method of claim 13, wherein each of the plurality of rods has a circular cross-sectional shape.

16. The method of claim 13, wherein at least some of the plurality of rods have a polygonal cross-sectional shape.

17. A multiplexing device, comprising:
    a first waveguide having a first length extending along a first direction, a first width extending along a second direction that is orthogonal to the first direction, and a first height extending along a third direction that is orthogonal to the first and second directions;
    a second waveguide aligned with the first waveguide along the first direction, the second waveguide having a second length extending along the first direction, a second width extending along the second direction, and a second height extending along the third direction, the second length of the second waveguide being greater than the first length of the first waveguide; and an optical isolator being partially positioned between the first waveguide and the second waveguide, the optical isolator having a third length extending along the first direction, a third width extending along the second direction, and a third height extending along the third direction, the third height being greater than at least one of the first height or the second height, the optical isolator being formed of a material that is different from a material of the first waveguide or a material of the second waveguide, wherein the optical isolator is a discrete periodic structure, and the discrete periodic structure includes a plurality of rods extending along the first direction.

18. The multiplexing device of claim 17, wherein a wave passing through the first waveguide has a first phase corresponding to the first length, a wave passing through the second waveguide has a second phase corresponding to the second length, and a difference between the first and second phases is corresponding to the difference between the first length of the first waveguide and the second length of the second waveguide.

19. The multiplexing device of claim 17, wherein the optical isolator includes a first metallic layer adjacent to the first waveguide along the second direction, and a second metallic layer adjacent to the second waveguide along the second direction.

20. The multiplexing device of claim 17, wherein the optical isolator is absent from portions of a space between the first and second waveguides to reduce optical isolation in those portions.

* * * * *